July 15, 1941.                L. WILSON                2,249,410
                METHOD AND APPARATUS FOR REDUCING ORE
                    Filed March 30, 1940          4 Sheets-Sheet 1
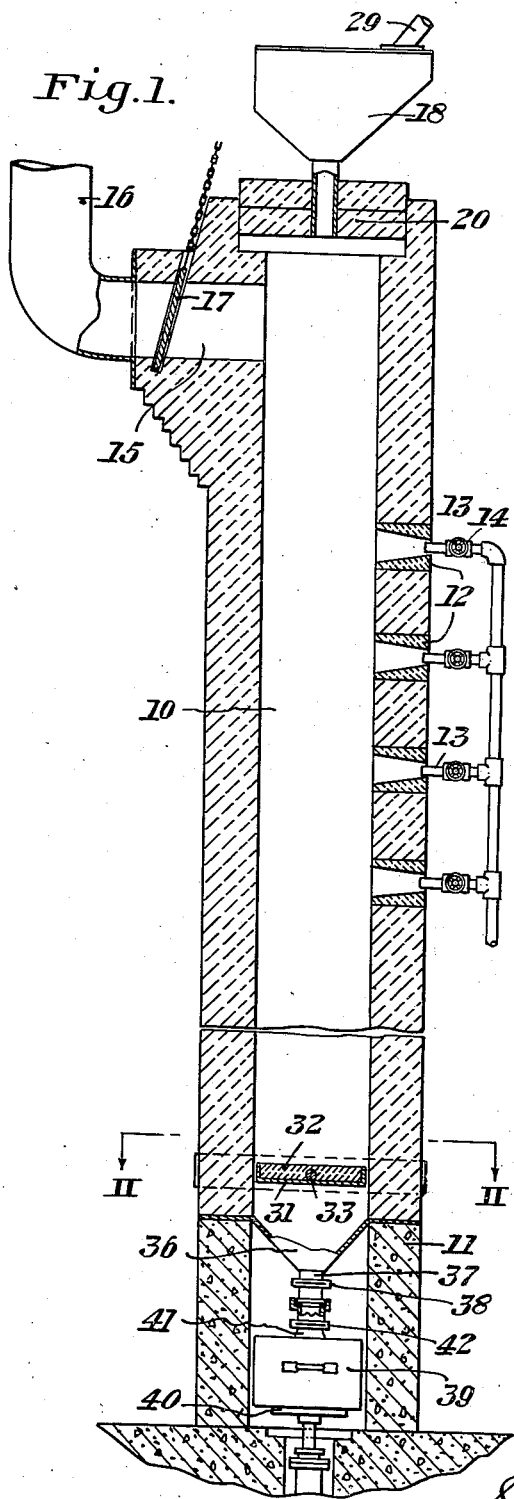
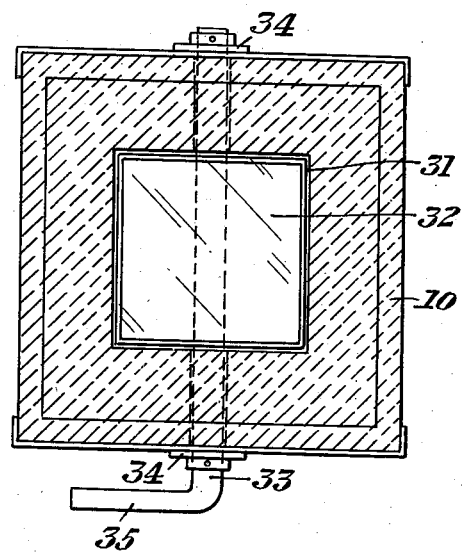
INVENTOR
Lee Wilson
by his attorneys
Stebbins, Blenko & Parmelee July 15, 1941.  L. WILSON  2,249,410
METHOD AND APPARATUS FOR REDUCING ORE
Filed March 30, 1940  4 Sheets-Sheet 2
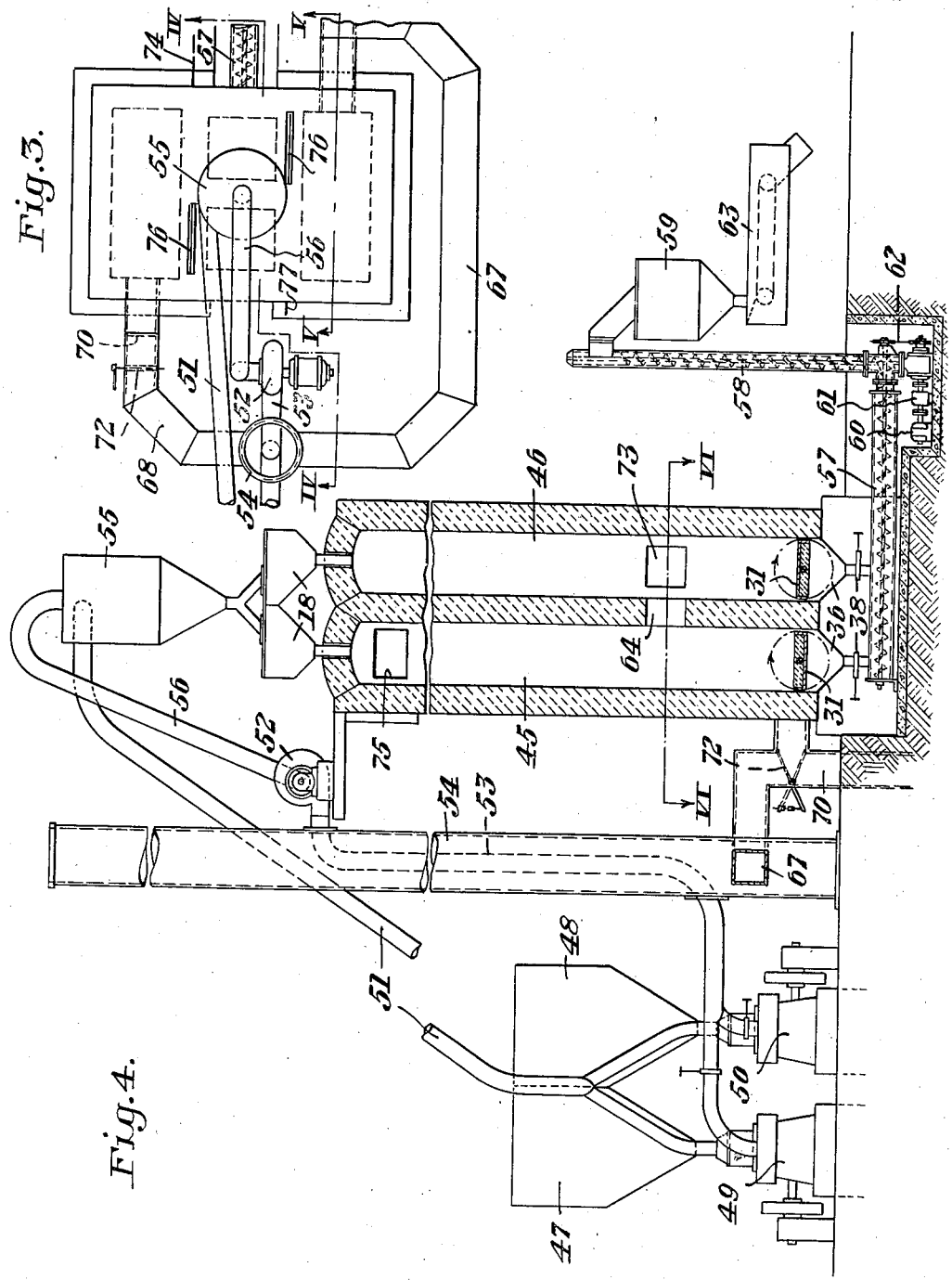

July 15, 1941.   L. WILSON   2,249,410
METHOD AND APPARATUS FOR REDUCING ORE
Filed March 30, 1940   4 Sheets-Sheet 3

INVENTOR
Lee Wilson
by his attorneys
Stebbins, Blenko & Parmelee

July 15, 1941.    L. WILSON    2,249,410
METHOD AND APPARATUS FOR REDUCING ORE
Filed March 30, 1940    4 Sheets-Sheet 4

INVENTOR
Lee Wilson
by his attorneys
Stebbins, Blenko & Parmelee

Patented July 15, 1941

2,249,410

UNITED STATES PATENT OFFICE 2,249,410

METHOD AND APPARATUS FOR REDUCING ORE

Lee Wilson, Cleveland, Ohio

Application March 30, 1940, Serial No. 326,986

7 Claims. (Cl. 75—26)

This invention relates to the direct reduction of ore and, in particular, to the manufacture of sponge iron from iron ore or other forms of iron oxide.

Considerable effort and money have been expended over a long period of time, in attempts to reduce metallic ore, particularly iron ore, to the pure metal directly but such efforts, so far as I am aware, have not been successful commercially. A consideration of the various processes and apparatus proposed for this purpose heretofore leads me to conclude that they have been characterized by one or more of several conditions which practically precluded the carrying out of a successful operation on a commercial scale.

The first of these conditions is that of temperature. Attempts to effect the direct reduction of iron ore at temperatures below 2000° F. show that at such temperatures, the reaction is so slow that it is impractical from the commercial standpoint. In operating above this temperature, however, a different problem is encountered, viz., the fact that the iron oxides become so sticky that mechanical handling thereof is practically impossible.

The second condition is the maintenance of a reducing atmosphere surrounding the mass of oxides. It is well understood that the reduction of iron oxide, for example, is effected by the oxidation of CO to $CO_2$, the oxygen being abstracted from the iron oxide. The $CO_2$, however, is not a reducing agent and if the reducing operation is continued for very long, the initial reducing agent, i. e., CO or $H_2$, is converted into a product, i. e., $CO_2$ or $H_2O$, which has no reducing action. Very shortly, therefore, the rate of conversion falls sharply because the reducing agent is no longer present in sufficient concentration to continue the reduction at the high initial rate. For practical purposes, it appears that the ratio of the reducing agent such as CO to the oxidized end product such as $CO_2$ must be at least 4 to 1.

Another condition which has not been successfully met heretofore is the supply of sufficient heat to cause the reconversion of $CO_2$ to CO, which is an endothermic reaction. In order to continue the reducing of the metallic oxide, the $CO_2$ must be reacted with carbon to form additional CO, so that after the initial reduction of $Fe_2O_3$ to $Fe_3O_4$, the reduction may continue further, i. e., from $Fe_3O_4$ to FeO and finally Fe.

I have invented a novel method and apparatus for the direct reduction of oxides such as metallic ores, which avoid the conditions above outlined which have militated against the success of previous attempts to achieve this result. In a preferred practice of the invention, I effect the reduction of the oxide in finely divided form, while it is in suspension in a reducing medium. Specifically, I discharge the oxide downwardly in the form of a shower descending through reducing atmosphere in a reaction tower heated to a temperature above 2000° F., thereby effecting a substantially instantaneous reduction of the oxide while in suspension. The reduced metal is collected at the bottom of the reaction zone and is protected from contact with the atmosphere until it has cooled sufficiently to prevent rapid atmospheric oxidation. The reducing atmosphere may be supplied in any one of a number of ways. Raw natural gas may be delivered to the reaction tower. Hydrocarbon oil may be sprayed into the tower and vaporized. Solid material such as coal, coke, charcoal or carbon in finely divided form may be admitted to the tower mixed with the oxide. This is the practice which will be particularly described herein.

One form of apparatus which I have successfully employed comprises a refractory-lined tower having means for heating the interior thereof, means for discharging a shower of oxides and a reducing agent downwardly therethrough, and means adjacent the bottom for receiving the material after it has fallen through the tower. In an improved form of the apparatus, I employ twin reaction towers and operate them alternately, reheating each tower between successive operations. The improved form of the apparatus also comprises regenerators for supplying hot air to the tower being heated, for combustion with the excess of combustible gas formed in the tower which is in operation.

Additional novel features of the apparatus and a complete explanation of the method performed thereby will appear in the following detailed description which refers to the accompanying drawings illustrating somewhat diagrammatically the apparatus involved. In the drawings, Fig. 1 is a central, vertical section through a simple form of reaction tower, parts being shown in elevation;

Fig. 2 is a transverse section through the tower taken along the plane of line II—II of Fig. 1;

Fig. 3 is a plan view of a modified form of apparatus embodying twin reaction towers, with parts omitted for the sake of clearness;

Fig. 4 is a view partly in section along the plane of line IV—IV of Fig. 3; with parts in elevation;

Figure 5:
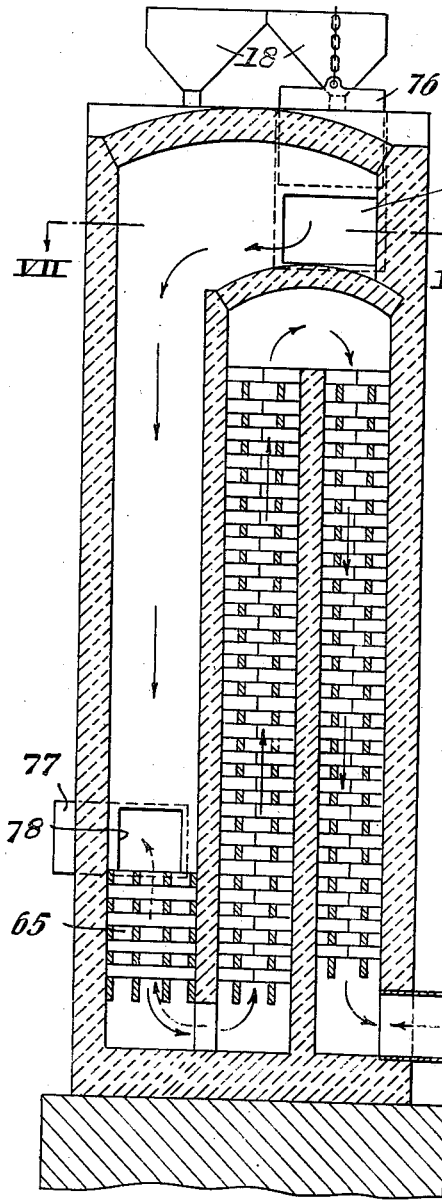
Fig. 5 is a vertical section through one of the regenerators, taken along the plane of line V—V of Fig. 3.

Referring now in detail to the drawings and, for the present, to Figs. 1 and 2 particularly, a reaction tower 10 is constructed on any suitable foundation 11 and is built up to a convenient height, e. g., 25 feet. The tower is lined with refractory brick. Burner blocks 12 are laid in the wall as shown and burners indicated diagrammatically at 13 installed in connection with the blocks. The burners are connected by suitable piping to any convenient source of fuel and may be provided with appropriate control valves 14. An offtake 15 leading from the upper end of the tower conveys waste combustion gases to a stack 16. A damper 17 is provided whereby the offtake 15 may be partly or fully closed. A feeder 18 is mounted on top of the tower.

Figure 8:
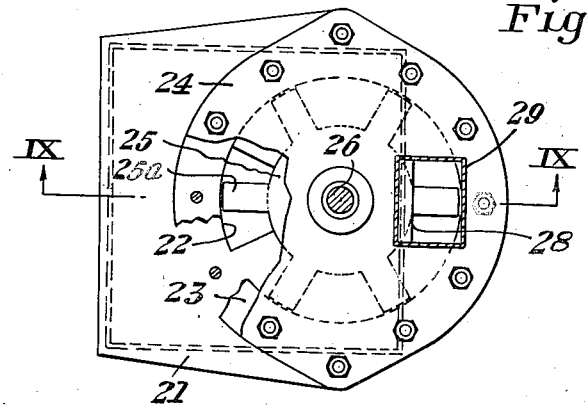
Fig. 8 is a view partly in section and partly in plan, with parts broken away, showing one form of feeder for discharging the mixture of oxide and reducing agent into the top of the reaction towers.
Figure 9:
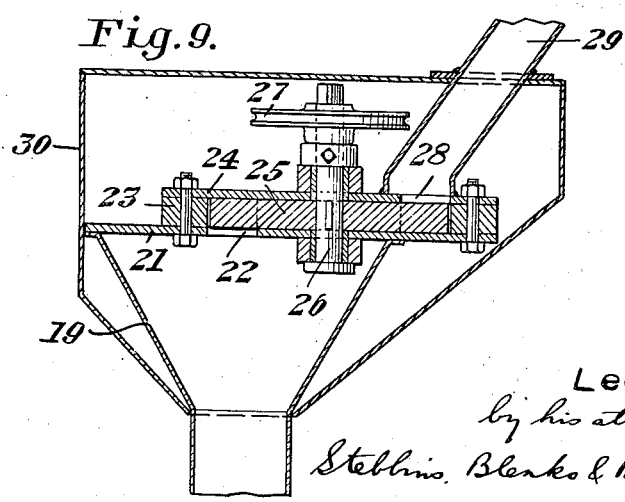
Fig. 9 is a sectional view taken along the line IX—IX of Fig. 8 with parts in elevation.

The details of the feeder are illustrated in Figs. 8 and 9. As there shown, the feeder comprises a discharge funnel 19, the spout of which extends through the roof of the tower indicated at 20. A cover 21 mounted on the funnel has a discharge port 22 therein. An annular ring 23 and a disc 24 supported thereon provide a housing for a feeder rotor 25 having radial projections 25a. The rotor is mounted on a shaft 26 journaled in bearings carried on the cover 21 and the disc 24. The shaft 26 has a driving pulley 27 thereon whereby the rotor 25 may be driven by a suitable motor (not shown).

The disc 24 is provided with an opening 28 at a point spaced circumferentially from the opening 22 in the cover 21. A supply duct 29 terminates at the opening 28. By this construction, material supplied through the duct 29 flows through the opening 28 into the spaces between the radial projections 25a of the rotor 25 and is carried around with the latter and finally falls through the opening 22 into the funnel 19. The upper portion of the feeder is preferably enclosed within a suitable housing 30.

Referring again to Figs. 1 and 2, a tilting hearth 31 is mounted adjacent the bottom of the tower. The hearth has a refractory layer 32 thereon and is secured to a shaft 33 extending through the furnace walls and journaled in bearings 34 secured thereto. A lever 35 extending from one end of the shaft 33 permits the hearth to be turned manually.

A hopper 36 at the bottom of the tower has a discharge spout 37 provided with a valve 38, conveniently of the sliding closure type.

A box 39 is removably disposed below the spout 37 on a lifting table 40. The box has a neck 41 adapted to make a gas-tight connection with the spout 37 on being raised into engagement therewith. The neck 41 has a valve 42 therein.

In using the apparatus described thus far, in the performance of the method of my invention, I first heat the interior of the tower 10 by firing the burners 13 for a period of time sufficient to raise the temperature thereof substantially above 2000° F., and preferably in the neighborhood of 2300° F. During the firing stage of the complete operating cycle, the damper 17 is opened to the extent necessary to permit waste combustion gases to be discharged. The hearth 31 is turned so that its refractory surface is uppermost as shown in Fig. 1. The valve 38 in the spout 37 of hopper 36 is closed. When the interior of the tower has been heated to the proper temperature, the burners 13 are shut off and the damper 17 is closed. The feeder 18 is then operated to deliver a mixture of finely ground oxides such as those of iron, and a reducing agent such as coal in a state of fine subdivision.

The oxide to be reduced and the coal are ground in a ball mill, for example, to a fineness such that they will pass through a screen of 45 mesh or more. The mixture of oxide and reducing agent is composed of approximately 600 pounds of coal to a ton of oxide. The mixture may be delivered to the feeder 18 in any convenient manner, as from an overhead storage hopper (not shown).

During the reaction stage of the cycle, the mixture of oxide and reducing agent is discharged by the feeder 18 into the upper end of the tower. Preferably a small amount of finely ground coal is delivered to the tower first in order that the volatile contents thereof, on vaporization, will remove any traces of atmospheric oxygen and establish a highly reducing atmosphere. The material discharged into the tower by the feeder falls in the form of a descending shower, because of its fine state of subdivision, floating slowly downward. As stated, the volatilization of the coal produces a highly reducing atmosphere and, as a result, the particles of oxide, when heated sufficiently by radiation from the interior walls of the tower, are reduced substantially instantaneously in suspension. By the time the metallic particles reach the hearth 31, they have been largely reduced to pure metal in the form of sponge iron.

In a particular installation, I have operated on a cycle of about 20 minutes for the heating-up and reaction stages, and discharged about 400 pounds of a mixture of oxide and coal during the reaction stage.

When the desired amount of material has been processed, the hearth 31 is tilted to dump the metal and excess coal accumulated thereon into the hopper 36. The hearth is then reversed, the damper 17 opened, and the burners 13 again fired to bring the interior of the tower back to the desired temperature. The passage of the oxides and coal through the tower effects a slight cooling thereof but a relatively short heating-up period is sufficient to restore the temperature to the previous operating value of approximately 2300° F.

The material collected in the hopper 36 is discharged into the box 39 by opening the valves 38 and 42 after a gas-tight engagement of the neck 41 with the spout 37 has been effected. After delivery of the material into the box, the valves are re-closed, the box is lowered and removed to permit cooling thereof. Atmospheric oxidation of the reduced metal is thus prevented. It is easily possible to purge the box 39 of air before admitting the reduced metal, to further limit re-oxidation thereof. I accomplish this by suitable piping connections (not shown) whereby the reducing gases formed in the interior of the tower are supplied to the interior of the box.

Referring now more particularly to Figs. 3 through 7, I have there shown an improved form of apparatus whereby substantially continuous processing may be carried out. In this form of the apparatus, I provide twin towers 45 and 46, similar in general to the tower 10 already described. Each tower has its feeder 18 and tilting hearth 31. Coal and iron ore are stored in hoppers 47 and 48, respectively, and are ground to the requisite degree of fineness in ball mills 49 and 50. The material is elevated from the mills through a duct 51 by an air stream created by a blower 52. An air pipe 53 connecting the blower to the mills passes through a stack 54 through which waste combustion gases from the towers are discharged, thereby heating the air delivered to the mills and tending to dry out the ore and coal.

The duct 51 discharges into a cyclone separator 55 which delivers the mixture of coal and oxides to the feeders 18. The blower 52 withdraws air from the separator 55 by means of a connecting duct 56.

Hoppers 36 at the bottom of the towers 45 and 46 deliver reduced metal to a closed air-tight screw conveyor 57 which is preferably provided with artificial cooling means such as a water jacket (not shown). Reduced metal delivered to the conveyor 57 from the hoppers 36 under the control of valves 38, is delivered to an elevating conveyor 58 which discharges it into a hopper 59. The conveyor 57 and its cooling means and the conveyor 58 are so designed that by the time the reduced metal reaches the hopper 59, it is below the temperature at which it oxidizes rapidly in the atmosphere. The screw of conveyor 58 is driven by a motor 60 through suitable reduction gearing 61. The screw of conveyor 57 is driven by a chain-and-sprocket drive 62 operating off the drive shaft of the conveyor 58. The hopper 59 discharges into a magnetic separator 63 which is effective to separate the particles of reduced metal and unreduced ore from any unconsumed particles of coal, and delivers the different materials to separate receptacles, in the known manner.

The reducing gases formed by the volatilization of the coal, in the process already described, are combustible and have a thermal content of about 300 B. t. u. per cubic foot. The excess of such gases which I find it desirable to generate, theoretically would afford sufficient heat to restore the interior of the tower to the proper reaction temperature, if burned therein. The continuous processing apparatus shown in Figs. 4 through 7 makes this possible. A port 64 connects the towers 45 and 46 a short distance above the bottom thereof whereby the excess of reducing gas, principally CO and H₂, formed in one tower, may flow into the other for combustion therein. In order to support such combustion, I supply hot air to the tower which is being heated up. This hot air is obtained by the use of regenerators 65 and 66 associated with the towers 45 and 46. The regenerators are also heated by the waste combustion gases before they pass up through the stack 54. Waste gas ducts 67 and 68 extend from the bottoms of the regenerators to the stack 54 and have air inlet branches 69 and 70. The flow of waste gases or air through the regenerators is controlled by reversing valves 71 and 72.

In explaining the operation of the continuous processing apparatus, it will be assumed first that the tower 45 is operating on the reaction stage of the cycle and the tower 46 on the heating-up stage. It will also be assumed that the regenerator 66 has previously been heated. The excess of CO formed in the tower 45 flows through the port 64 and into the tower 46. Hot air is also supplied to the tower 46 through a port 73 leading from the regenerator 66 and controlled by a damper 74. This air is supplied from any convenient source such as a blower and is delivered to the regenerator 66 through the branch connection 70, the valve 72 being in its upper position as illustrated in Fig. 4. The air, on traversing the several passes of the regenerator 66 (similar to those of regenerator 65 shown in Fig. 5 but oppositely disposed) is preheated and is finally discharged through the port 73 into the tower 46.

After combustion in the tower 46, the gases flow through a port 75 near the top of the tower controlled by a damper 76, into the regenerator 65. The valve 77 of the air port 78, corresponding to the port 73 of the regenerator 65 is closed and then the combustion gases flow through the several passes of the regenerator 65 and thence outwardly through the duct 67 to the stack 54, the damper 71 being in its lower position. The regenerator 66, of course, has a port corresponding to that shown at 75 and a control damper which is closed when the regenerator 66 is supplying hot air.

It will be apparent that when the tower 46 is operating on the reaction stage, the reverse of the operations described above may be effected by shifting the reversing dampers 70 and 71, the damper 76 and the valve 77. Air will then be supplied through the regenerator 65 and be delivered through the port 78 to the tower 45 to support combustion of the excess of combustible gases flowing thereinto through the port 64. The combustion gases will then pass through ports 75 into the regenerator 66 and after traversing the several passes thereof will flow through the duct 68 to the stack 54. The path of the air through the regenerators is indicated in Fig. 5 by dotted arrows and the path of the waste gases by solid arrows.

It will be clear from the foregoing that the apparatus shown in Figs. 3 through 7 is adapted to provide a substantially continuous processing since one tower is being reheated while the reducing reaction is taking place in the other. Ordinarily, the heating-up stage of the cycle is of about the same length as the reaction stage so that the only loss of time involved between cycles is that necessary to operate the reversing valves and dampers. In describing the operation of the apparatus shown in Figs. 3 through 7, it was assumed that one of the regenerators was hot initially. It is evident that some means must be provided for heating the reaction towers 45 and 46 and the regenerators 65 and 66 when starting operations. Any convenient means may be employed for this purpose, e. g., burners, such as those shown at 13 in Fig. 1. While such burners have not been illustrated in Figs. 4, 6 and 7, it will be apparent that they or some equivalent will be installed for the purpose indicated.

Figure 10:
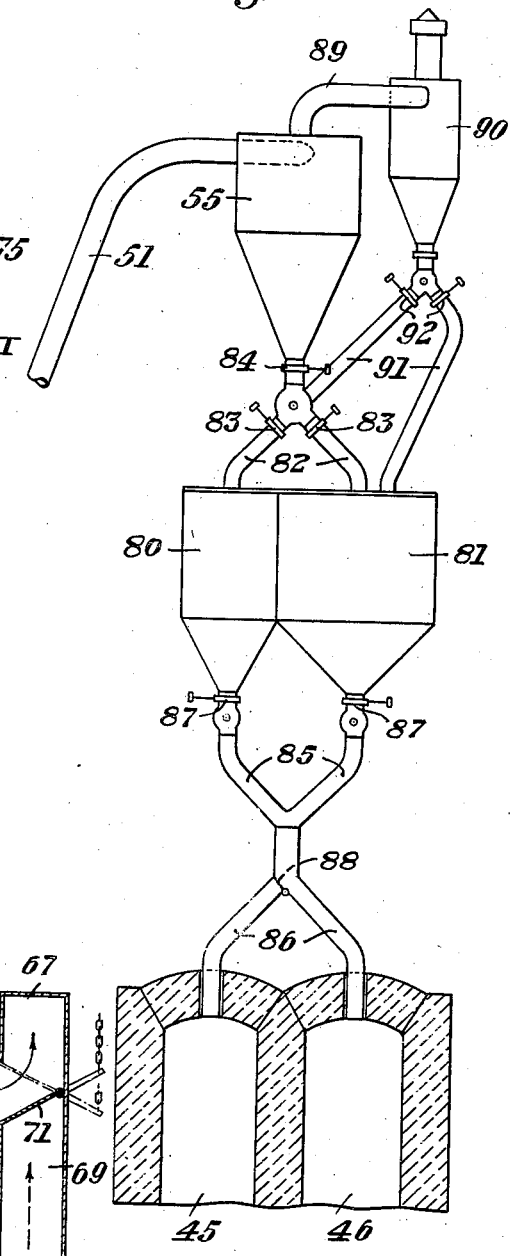
Fig. 10 is a view partly in section and partly in elevation showing a modification of a portion of the apparatus shown in Fig. 4.
Figure 6:
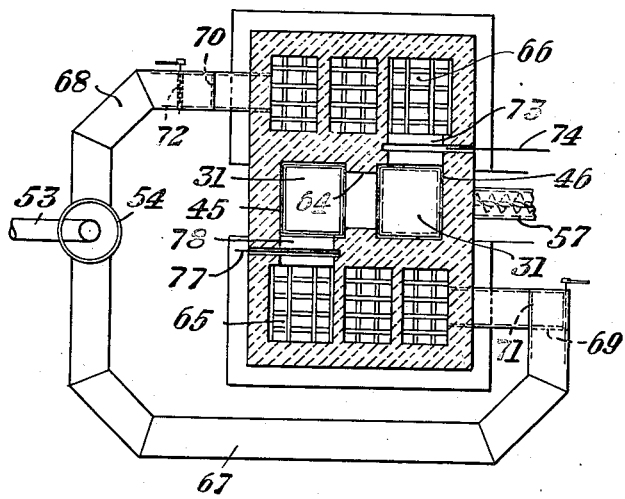
Fig. 6 is a horizontal section taken along the plane of line VI—VI of Fig. 4.
Figure 7:
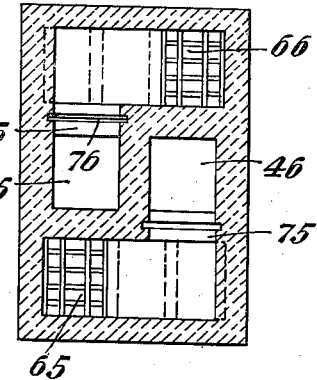
Fig. 7 is a similar section taken along the plane of line VII—VII of Fig. 5.

Fig. 10 illustrates a partial modification of the apparatus shown in Fig. 4. According to this modification, the duct 51 delivers oxides and the reducing agent to the separator 55, as in Fig. 4. The separator 55, however, delivers the materials to hoppers 80 and 81 through pipe connections 82 under the control of valves 83 and 84. The hoppers 80 and 81 deliver material alternately to the towers 45 and 46 through pipes 85 and 86 under the control of valves 87 and a diverter valve 88.

The air from the separator 55 is conveyed through a duct 89 to a second separator 90; the latter discharges selectively into the hoppers 80 and 81 through pipes 91 under the control of valves 92. With this construction, the air by which the materials are elevated to the top of the apparatus is not re-used as in Fig. 4.

It will be apparent from the foregoing description and explanation that the invention is characterized by numerous advantages over the apparatus and methods by which it has been attempted heretofore to effect the direct reduction of metallic oxides such as iron ore. In the first place, the maintenance of the desired high temperature within the reaction towers may be accomplished quite easily. The materials undergoing reaction have little or no contact with the walls of the towers and only superficial contact at the most. By effecting the reduction while the materials are in suspension, as they fall in a slowly descending shower, the difficulty of the mechanical handling of the material at elevated temperatures incident to the stickiness which it exhibits, is obviated.

By supplying an excess of the amount of coal theoretically required to effect the reduction, I insure that the ratio of reducing gas to non-oxidizing or oxidizing gas is never less than 4 to 1. The presence of the excess of carbon causes $CO_2$ to be reconverted into CO for a further reducing action on the oxide. This reaction is facilitated because ample heat is available to supply the amount absorbed by the reaction.

Further advantages lie in the fact that the operation may be carried out in a substantially continuous manner whereby it may readily be controlled with a minimum of manual effort. The thermal efficiency of the apparatus is high, particularly when the combustible reducing gases formed in the reaction tower are burned to heat up an adjacent tower for the next reaction stage.

Although I have illustrated and described herein but a preferred practice and a few typical forms of the apparatus, it will be understood that numerous changes in the procedure and construction disclosed may be made without departing from the principles of the invention or the scope of the appended claims. Specifically, the invention is not limited to the generation of a reducing atmosphere by the admission of volatilizable solids or carbon, but also contemplates the introduction of reducing gases directly or liquids which when volatilized produced a reducing atmosphere.

I claim:

1. In a method of reducing oxides, or the like, the steps including discharging a shower of a finely divided mixture of the oxides and a reducing agent downwardly, in a freely falling shower, through one of a pair of substantially vertical reaction chambers heated to a temperature above 2000° F., thereby effecting a substantially instantaneous reduction of the oxides in suspension, collecting the reduced material adjacent the bottom of the chamber, and delivering the combustible gas formed in said one of said chambers to the other of said chambers for combustion therein to heat the latter for a succeeding reaction.

2. Apparatus for reducing oxides comprising a pair of substantially vertical reaction chambers, a connection between the chambers adjacent their bottom, means for feeding oxides and a reducing agent downwardly into each chamber in a descending shower, means for supplying air to one chamber to support combustion therein of combustible gases formed by the reaction in the other and traversing said connection, and a regenerator for each chamber adapted to be heated by waste gases and to preheat the air supplied to said one chamber.

3. In a method of reducing oxides the steps including conveying finely divided particles of oxides and a reducing agent in an air stream to the top of a reaction tower, separating the particles from the air, discharging the particles downwardly through the tower in a descending shower, preheating the air by contact with waste gases from said tower and using the preheated air again to convey particles to the top of the tower.

4. Apparatus for reducing oxides comprising a substantially vertical reaction tower, means for feeding a mixture of oxides and a reducing agent into the tower adjacent the top in a descending shower, a duct for elevating the oxides and reducing agent to the top of the tower, a blower for creating a flow of air through the duct, and means utilizing waste gases from said tower for preheating the air flowing through said duct.

5. In a method of reducing oxides such as those of iron, the steps including supplying heat to the walls of a reaction chamber until their temperature exceeds the minimum at which reduction of the oxide occurs readily, discontinuing the supply of heat, discharging a mixture of finely ground particles of the oxide and a reducing agent such as coal, in the form of a freely falling shower, through said reaction chamber while maintaining the atmosphere therefor relatively quiescent and excluding atmospheric air therefrom, thereby effecting a substantially instantaneous reduction of the oxide in suspension as it falls through said chamber, and collecting the reduced metal and any unused reducing agent at the bottom of said chamber.

6. In a method of reducing oxides, or the like, the steps including supplying heat to the walls of a reaction chamber until their temperature exceeds the minimum at which reduction of the oxide occurs readily, discontinuing the supply of heat, discharging a mixture of the oxides and a reducing agent in a finely divided state, downwardly in a freely falling shower, through said reaction chamber while maintaining the atmosphere therein relatively quiescent and excluding atmospheric air therefrom, thereby effecting a substantially instantaneous reduction of the oxides in suspension, and collecting the reduced material adjacent the bottom of the chamber.

7. In a method of reducing a compound, the steps including supplying heat to the walls of a reaction chamber until their temperature exceeds the minimum at which reduction of the compound occurs readily, discontinuing the supply of heat, discharging a finely divided mixture of the compound and a reducing agent downwardly in a freely falling shower, through said reaction chamber while maintaining the atmosphere therein relatively quiescent and excluding atmospheric air therefrom, thereby effecting a substantially instantaneous reduction of the compound, and collecting the reduced material adjacent the bottom of the chamber.

LEE WILSON.